Aug. 11, 1959          E. PIROT          2,899,201
GUIDE AND TENSIONING DEVICE FOR PROCESSING FILMS AND FOILS
Filed Jan. 23, 1958
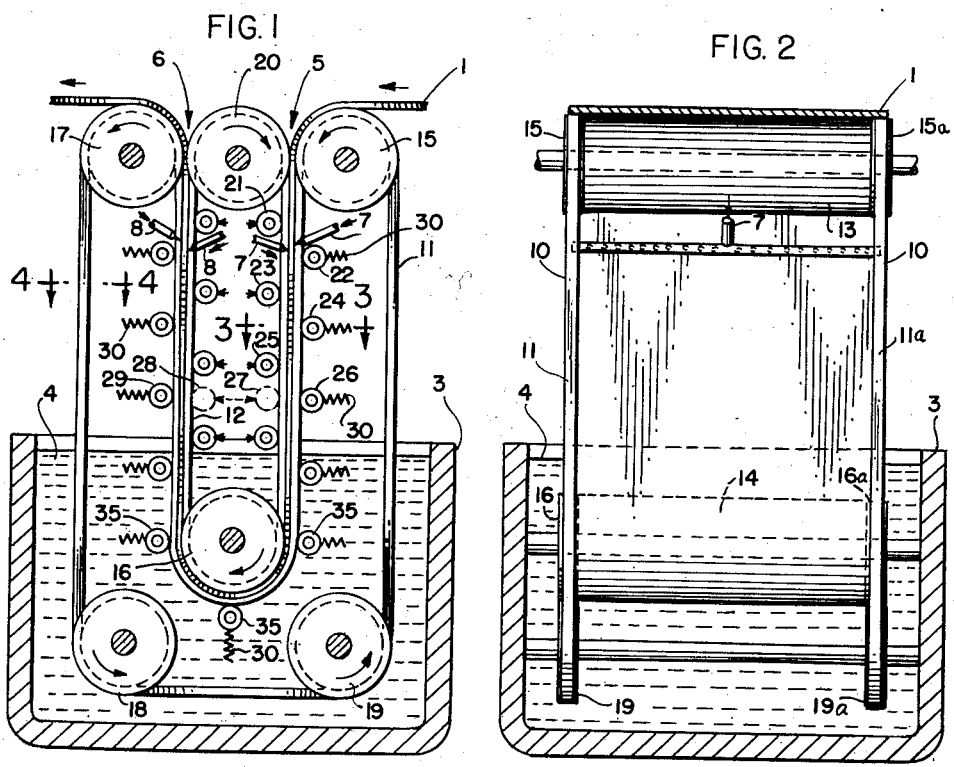
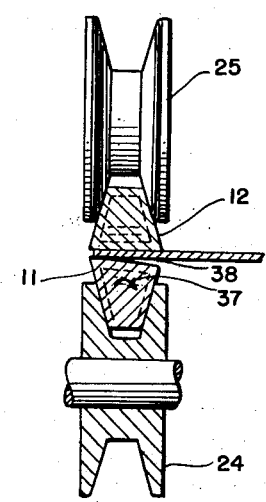
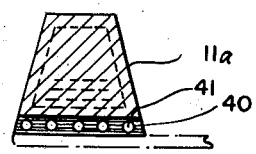
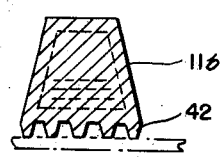
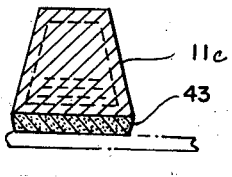
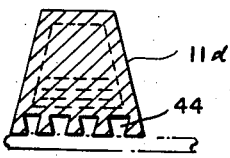
INVENTOR:
ERNST PIROT
BY
Mazall, Johnston, Cook & Root
ATT'YS

United States Patent Office 2,899,201
Patented Aug. 11, 1959

2,899,201

GUIDE AND TENSIONING DEVICE FOR PROCESSING FILMS AND FOILS

Ernst Pirot, Wuppertal-Barmen, Germany, assignor to J. P. Bemberg Aktiengesellschaft, Wuppertal-Oberbarmen, Germany Application January 23, 1958, Serial No. 710,806

Claims priority, application Germany January 30, 1957

8 Claims. (Cl. 271—45)

This invention relates to a device for the securing of the edges of sheet material during production and subsequent treatment in a continuous process wherein sheets, foils or films, as the case may be, are subjected to tension during their movement through processing solutions. To maintain operable process conditions for this purpose, the sheet material must be secured to prevent excessive shrinking at the edges thereof by force-transferring or tensioning means.

Heretofore in the production and subsequent treatment of such films, the procedure was such that the films were guided over rollers mounted in close succession. In this arrangement projections and roughenings on the roller surfaces were intended to prevent a contraction of the film transversely to its direction of movement during the shrinking process. Such devices have not proved successful, since, on the one hand, they do not fully meet expectations in regard to control of the width and tension of the foil, and they also inhibit or limit the wetting of the films at the points of clamping of the films by the processing fluid. Thus, in an attempt to overcome the problem, the machine as a whole was increased in length. Because of the increased number of rollers, the device became extremely complicated, and also brought about considerable alterations of the film surface.

The practice soon changed, therefore, to that of securing the edges of the films and foils themselves and of transferring forces to these by way of gripping or clamping jaw and chain members. Such chain and tension members had many drawbacks because they placed excessive strain on the thin and extremely delicate foil at the clamping points. Often the foil was pierced or broken at and along the points of seizure. In other apparatus wide, flat belts were substituted which ran between pressure plates with films of material under process sandwiched between the flat belts as the film or foil was carried along through various process steps. The wide, flat belts and pressure plates afforded little practical improvement. The belt and pressure plate system, because of the relatively large gripping width necessary, suffered the drawback that along the area of mutual contact of sheet and belt the treating fluid could not be brought into contact with the sheet or film material being processed. Fluid contact in certain processing steps notably in viscose processing completes regeneration of the cellulose. Thus, contact of the solution is essential to the ends of the process. The consequence of this failure of solution contact is that precisely at the points along the surface of the foil which had to take over the greatest strain in forwarding and holding the sheet material, the lowest foil strength was available. The areas of failure in treatments concerned with regenerative process chemical solutions were most often observed where the solutions were prevented from contact with the moving sheet. Prior art sheet advancing and holding devices proved extremely disadvantageous in transporting of films and foils, particularly those produced by the cupric oxide-ammonia-cellulose process. The not-yet-regenerated film, ordinarily designated as blue film, most often broke along the outer edges of the foil, corresponding to areas held within the gripping means of the edge-holding devices.

The unit device of this invention, for the continuous fluid treatment of strips of sheetlike material under tension, comprises a vertically suspended and inner first pair of endless V-belts in equally spaced horizontal relationship. A top and bottom cylinder of the same length are fitted at opposite ends with pulleys fastened to the cylinders. The cylinders and pulleys are such that the cylinder is of substantially the same diameter as the pulley with the inner V-belt in place. This first pair of belts are mounted for continuous and constant movement in relation to one another about the vertically aligned supporting cylinders and first set of pulleys, the lower cylinder thereof being adapted to be submerged in a treating vessel. Advantageously the inner belt system, cylinders and related pulleys are supported from the treating vessel. An outer second pair of vertically suspended endless V-belts are in substantially identical horizontal spaced relationship to the inner pair of belts just described. The outer belts are mounted for continuous and constant movement in relation to one another and at the same linear velocity as the inner belts. The outer V-belts are vertically supported and aligned by means of a pair of upper cylinders having pulleys affixed to the opposite ends and a second set of lower outer pulleys lying in the same plane as the upper pulleys. Correlating ones of said inner and outer pulleys rotate in the same plane and the outer set of pulleys are space supported on their respective cylinders or shafts so that the backs of the inner V-belts carried by these pulleys are in contacting relationship with the backs of the outer V-belts throughout a substantial portion of the length of the inner belts. The line of contact between the backs of the inner and outer belts define a pair of spaced U's in parallel planes and are held by pressure means in such manner as to engage a strip sheet of material being processed between their contacting V-belt backs by means of a bight formed as the moving belts and the cylinders to which they are affixed come together at a point of entry into said device which engages the foil or films being processed and advances the same through the processing device under vertical tension between the related inner cylinders and horizontal tension at the edges of the sheet along the U-shaped path of mutual belt contact. A series of spaced apart and oppositedly disposed but preferably staggered smaller pulleys or rollers supported along the interior side of each of said pairs of V-belts along the path of mutual contact are adapted, through a spring arrangement, to provide substantially uniform contact pressure between the backs of said inner and outer belts along their path of contact. Pressure thus developed along the zone of contact holds the strip material to be treated in firm engagement along the outer edges of the strip of film or foil as it passes through the treating solution.

The unit device of this invention is described in greater detail in conjunction with the following description and the accompanying drawings in which:

Figure 1 is an end view, partially in section;

Figure 2 is a front view, partially in section with parts broken away;

Figure 3 is a section along the line 3—3 of Figure 1;

Figure 4 is a section along the line 4—4 of Figure 1, illustrating one modification of the invention;

Figure 5 is similar to Figure 4, illustrating a second modification;

Figure 6 is similar to Figure 4, illustrating another modification of V-belt cross-section;

Figure 7 is still another sectional modification of V-belt cross-section along line 4—4 of Figure 1.

Referring in greater detail to the accompanying drawings; in Fig. 1, foil 1, running in a continuous operation, is conducted through one illustrative unit of a plurality of units constituting the processing device. The unit consists of a tank 3, filled with processing fluid 4. The foil 1 is conducted over the cylinder defining the horizontal spacing between pulleys 15 and 15a, thence downwardly in descending branch 5 into the bight between the converging V-belts 11 and 12 and the cylinder 13 defined by pulleys 15 and 15a and the cylinder defined between pulleys 20 and 20a, held by foil edges 10 sandwiched between the backs of V-belts 11 and 12 (and 11a and 12a) downward into tank 3 over the cylinder 14 defined by pulleys 16 and 16a, then in ascending branch 6 still gripped at edges 10 by the V-belts out of tank 3 and over the cylinder defined by pulleys 17 and 17a (17a not shown). Spray heads 7 and 8 mounted in pairs as shown, provide flooding devices to direct thin films of processing fluid over the surfaces of the foil, which fluid is directed now with or now against the foil's direction of movement depending upon the angle of attack of spray heads 7 and 8. Ultimately, most of process liquid 4 is returned to tank 3. During process and treatment, edges 10 of foil 1 are held between the backs of and by two endless V-belts 11 and 12 and 11a and 12a of corresponding nature. V-belt 11 comes into contact with foil 1 as the foil and V-belt enter at 5 over the deflecting guide roller 13 and pulleys 15—15a. V-belts 11 and 12 with the exterior edges of foil 1 sandwiched therebetween under the pressure of the pair of belts in engagement accompany foil 1 over and about the deflection cylinders lying between pulleys 16—16a and 17 and 17a. As the foil leaves the point of engagement of the V-belt backs at 6, the film separates from the cylinder defined by pulleys 17—17a and is conducted to the next in a series of similar processing unit devices, while endless V-belt 11 returns from pulley 17 over pulleys 18 and 19 to pulley 15. Inner endless belt 12 runs over pulley 20 entering the bight formed by juncture of belts 12 and 11 in descending branch 5 at which point the belts 12 and 11 grip the edges 10 of foil 1 and carry the foil downward past the spray heads 7 and through liquid 4 in tank 3. As V-belts 11 and 12 pass around pulley 16, foil 1 is moved in sandwich relationship between them upwards through the second set of spray nozzles 8 and out of ascending branch 6 where foil 1 is released from belt control, over pulley 17 and the correlative cylinder of the particular processing unit. Thus, while in the unit, foil 1 is firmly held between the spaced apart pairs of endless belts as illustratively shown at one end in Fig. 1 and along the outer peripheral edges of the foil 1 at 10 as is more clearly understood from Fig. 2. In order to exercise adequate control of the foil as it is carried in tension into the descending branch 5 and over the pulleys, the belts run between a series of guide and pressure pulleys or rollers 21, 22, 23, 24, 25, 35, 27 and 28, etc., the grooves of which are wedge-shaped to accommodate the V-belts. These guide rollers or pulleys may be diametrically opposite or in-line relationship with one another as are 26—27 and 28—29, or alternatively in staggered relationship as represented by rollers 21 and 22 or 25 and 26. Thus, while the guide and pressure rollers may be in an in-line or staggered arrangement, the latter position relationship is preferred. In order to obtain an adjustable and controllable contact pressure of the guide rollers, it is recommended that the rollers on one side, here, illustratively rollers 22, 24 and 26, be pressed against belt 11 by means of springs 30. Similar guide rollers 35 may press against belt 11 as belt 11 passes under and around the pulley 16 in order to guard against sideward movement of belt 11, guided at this area of arcuate movement only by its curvature about pulley 16 and the rims thereof. So shown in Fig. 1, three such rollers 35 and correlated springs 30 are provided for additional belt guidance at this point.

In Fig. 3, the design of the V-belts 11 and 12, along section 3—3, and their guidance in the wedge-shaped channels of guide rollers 24 and 25 is shown in greater detail. V-belts 11 and 12 may be twisted slightly as they advance without appreciable change in tension over the foil being carried through the process. This tendency to slight twisting serves as a guide to placement of the guide rollers 21 to 29, etc. A relatively high bending and resistance against the twisting of V-belts through guide roller placement makes it possible to keep the separation of individual ones of these guide rollers relatively large. Nevertheless, slight twistings, as indicated by arrow 37 in V-belt 11, do occur which lead to a slight lessening from time to time of the contact area as illustratively shown at 38. Thus, because of the small gaps which occur as shown at 38 during advancement of foils in the process, processing fluid may enter, touch and wet all surfaces of foil 1, at least momentarily, which makes possible reaction of processing solution and foil during treatment of the foils even between the V-belts, along areas corresponding to the course of the backs of the V-belts holding foil edges 10. Since the V-belts, as shown in cross-section, have only a relatively slight contact width in any case, the strengthening of the sheet material in the areas grasped between the V-belts by contact with treating solutions is also relatively good so that sufficient strength in the foil is obtained and breakage of the foils at or along gripping lines of contact of the belts does not occur.

In Figs. 4 through 7, various alternate modifications in V-belt cross-sections are shown which by their structures allow a variety of means to assist penetration of processing fluid into areas of the foil or sheet during process along zones of belt contact and pressure where the outer periphery or backs of the V-belts grasp foil 1 along its edges 10. For this purpose, the modification in Fig. 4 illustrates a V-belt identified as 11a provided with transverse grooves along the back or contact surfaces of the V-belt. The grooves may be diagonal or at right angles to the belt length to form ribs 40, which facilitate the penetration of process fluids when used in the present apparatus. Ribs 40 of V-belt 11a may also have ribs 40 alternately pierced as at 41 for more ready access of process fluid. In Fig. 5, instead of the transverse ribs; stud, button or humplike projections 42 may be formed on the contact surface of V-belt 11b, the intermediate spaces therebetween provide paths through which processing fluids may flow and penetrate. In the modification illustrated in Fig. 6, the back surface of V-belt 11c, facing and in contact with the foil when in use is covered with a layer of porous material 43, which is able to absorb processing fluid and thereby provide for wetting of the foil along the area gripped by the belts. Fig. 7 illustrates a modification wherein the outer peripheral back area of V-belt 11d is punctured to provide a heterogeneous series of holes 44 which tend to be filled with treating solutions when the belt is used in the manner herein described. Other modifications are obvious from those illustrated.

The unit holding device of the invention provides, as herein shown, oppositely disposed V-belts which are directed and controlled from a plurality of separated points so that a twisting movement of the belts as shown in Fig. 3 is permitted for the purpose of admission of processing fluid into the areas of the foil normally gripped by the belts and thus makes possible a secure holding even of extremely fragile sheet materials such as are precipitated, for example, in the production of foils by the cupric oxide-ammonia-cellulose process, without the occurrence of breakage. By modification in design of the outer back periphery of the V-belt, one may provide additional means to increase the access of treating solutions to areas normally blocked, for example, in the cellulose process named. There the regenerating fluid is provided with means of access into areas of the foil held in the grip of the V-belts. Thus, strengthening of the edge areas of the sheet material is still further increased. The V-belt holding system of the invention makes possible, therefore, in addition to an improved means for holding of the foil, an effective means for treating solutions to contact the film, foil or sheet in the belt contacting area heretofore not open to fluid contact so that more positive functioning of the fluid treating process within each processing unit is achieved.

According to the invention, the drawbacks of prior art devices for holding sheet material during processing have been eliminated by apparatus as above specifically illustrated wherein the outer edges of the strip film in each case are sandwiched between two pairs of endless V-belts pressed together under pressure and guide rollers, thereby securing the film between them. The belts are held within pulleys oppositely disposed on each end of the film guide rollers or cylinders and the contact pressure between the oppositely aligned belts is maintained by the pressure upon them of the oppositely disposed, staggered and spaced apart pressure rollers. Through use of V-belts a first advantage is gained in the decrease in number of the pressure rollers essential. The distance apart of these rollers and cylinders may be greater because of the greater general turning rigidity and the precurved, tensionless quality of V-belts. Where a slight twisting does occur under the foil tension in the intermediate ranges of the rollers, processing fluid is permitted to enter between the narrow contact surfaces of the V-belts onto difficult to reach areas of the foils, to assist regeneration of the foil and consequently impart greater strength to the treated sheet material at these points. Since the V-belts are relatively narrow and are readily guided in precise alignment on and over supporting rollers and pulleys, it becomes possible to modify the outer backing of the V-belts to provide means for adequate wetting of the edge strip of the foil normally held within the confines of the belt areas. This is accomplished without endangering transfer of forces as the foil is advanced, steady grip is maintained and the film is not allowed to contract under increasing tension. The arrangement of the pressure rollers pressing the V-belts together in staggered positions is preferred and has proved especially successful—that is, the pressure rollers are not mounted in pairs directly opposite one another, or in line, but are shifted with respect to one another (their diameters are at an angle) so that an axial twisting action of the two V-belts is alternatively taking place in each of the belts as they pass through and along between the guide rollers.

A further improvement in accordance with the invention is found in that the V-belts may be additionally provided with grooves arranged transversely or diagonally or crosswise (to create ribs) allowing the processing fluid to pass through and in contact with the film surface. It is also advantageous to provide either longitudinal or transverse ribs which are pierced with a plural number of passageways through said ribs. In this way it is possible for the processing fluid to have access along the edges of the strip of film, the areas within the clamping action of the belt backs being subjected to processing fluids during the period of time said areas are secured between the V-belts. Instead of ribs which define grooves as mentioned above to allow for access of the processing fluid, it is also possible to provide humplike or studlike projections on the outer periphery of the V-belt surfaces that hold the film. It is also possible, as illustrated and described above, to furnish the film-holding surfaces of the V-belts with a thin layer of porous material, absorbing and giving off processing fluid. In utilization of this arrangement, the porous material should preferably be of good resistance to the chemical effects of the processing fluid, just as the material of the V-belts must be. It is recommended, in the case of treatment of strips of film produced according to the cupric oxide-ammonia-cellulose process, that an acidproof rubber mixture surround a polyester cord and the same be used as sheathing fabric in the construction of V-belts for the purposes of this invention.

While in the foregoing, the deflecting cylinders 13 and 14 and pulleys affixed to the ends thereof, namely, 15—15a and 16—16a have been described as separate entities, it is obvious that they may be constructed as integral units. Other variations resulting in substantially equivalent means will be apparent and the particular embodimens herein illustrated are not to be construed as limiting, except in accordance with the following claims.

What I claim is:

1. A unit device for the continuous fluid treatment of strips of sheetlike material under tension comprising a vertically suspended and inner first pair of endless V-belts in equally spaced horizontal relationship, said first pair of belts mounted for continuous and constant movement in relation to one another about a vertically aligned, first supporting set of pulleys, the upper ones of said pulleys defining the ends of an upper cylinder, the lower ones of said pulleys defining the ends of a lower cylinder adapted to be submerged in a treating tank; an outer second pair of vertically suspended endless V-belts in substantially identical horizontal spaced relationship to said inner pair of belts, also mounted for continuous and constant movement in relation to one another and at the same linear velocity as said first inner pair of V-belts and vertically supported and aligned by means of a second outer set of pulleys the upper ones of which define cylinder ends, correlated ones of said inner and outer pulleys rotating in the same plane, said outer set of pulleys space supported so that the backs of the inner V-belts carried thereon are in contacting relation with the backs of the said outer V-belts throughout a substantial portion of the length of said inner belts, the line of contact thereof defining a pair of spaced U's in parallel planes, said inner and outer V-belts and said upper cylinders adapted to engage strip sheet between their contacting surfaces in a bight at the point of entry into and exit from said device and to advance said sheet under both horizontal and vertical tension between said V-belts throughout the U-shaped path of mutual belt contact; and a series of spaced apart rollers along said U-shaped path of mutual contact on the interior side of each of said pairs of spaced apart V-belts adapted to provide substantially uniform contact pressure between said inner and outer belts.

2. The same as in claim 1, wherein the spaced apart rollers along the path of belt contact are oppositely mounted in staggered relationship to one another along the legs of said U-shaped path.

3. Apparatus for continuous fluid treatment of strips of sheetlike material under tension comprising a tank adapted to contain a treating liquid, a cylinder mounted for rotation in said tank about a horizontal axis, a second cylinder mounted for rotation about an axis parallel with said first-mentioned axis and mounted above said tank, pulleys on each end of said cylinders, a pair of V-belts mounted over and extending between respective pulleys on said cylinders, a second pair of V-belts mounted on pulleys with a portion of the travel thereof being through a U-shaped path with the V-belts in back-to-back contacting relationship, said V-belts being adapted to engage and hold a sheet between their contacting surfaces in said U-shaped path of travel, and a plurality of pressure rollers supported along said U-shaped path and in rolling contact with said belts on the interior side thereof to provide substantially uniform contact pressure between said belts along said U-shaped path.

4. Apparatus for continuous fluid treatment of strips of sheetlike material under tension comprising a tank adapted to contain a treating liquid, a cylinder mounted for rotation in said tank about a horizontal axis, a second cylinder mounted for rotation about an axis parallel with said first-mentioned axis and mounted above said tank, pulleys on each end of said cylinders, a pair of V-belts mounted over and extending between respective pulleys on said cylinders, a second pair of V-belts mounted on pulleys with a portion of the travel thereof being through a U-shaped path with the V-belts in back-to-back contacting relationship, said V-belts being adapted to engage and hold a sheet between their contacting surfaces in said U-shaped path of travel, and a plurality of pressure rollers supported along said U-shaped path and in rolling contact with said belts on the interior side thereof to provide substantially uniform contact pressure between said belts along said U-shaped path, said pressure rollers being spaced apart sufficient distances to permit slight twisting of said V-belts during the running thereof about their longitudinal axes, thereby providing contact between portions of the sheet held between said belts and the liquid in said tank.

5. Apparatus for continuous fluid treatment of strips of sheetlike material under tension comprising a tank adapted to contain a treating liquid, a cylinder mounted for rotation in said tank about a horizontal axis, a second cylinder mounted for rotation about an axis parallel with said first-mentioned axis and mounted above said tank, pulleys on each end of said cylinders, a pair of V-belts mounted over and extending between respective pulleys on said cylinders, a second pair of V-belts mounted on pulleys with a portion of the travel thereof being through a U-shaped path with the V-belts in back-to-back contacting relationship, said V-belts being adapted to engage and hold a sheet between their contacting surfaces in said U-shaped path of travel, and a plurality of pressure rollers supported along said U-shaped path and in rolling contact with said belts on the interior side thereof to provide substantially uniform contact pressure between said belts along said U-shaped path, said V-belts having on the contacting backs thereof ribs running transverse to the length of said belts for providing better contact between the liquid in said tank and the portion of the sheet held between said belts.

6. Apparatus for continuous fluid treatment of strips of sheetlike material under tension comprising a tank adapted to contain a treating liquid, a cylinder mounted for rotation in said tank about a horizontal axis, a second cylinder mounted for rotation about an axis parallel with said first-mentioned axis and mounted above said tank, pulleys on each end of said cylinders, a pair of V-belts mounted over and extending between respective pulleys on said cylinders, a second pair of V-belts mounted on pulleys with a portion of the travel thereof being through a U-shaped path with the V-belts in back-to-back contacting relationship, said V-belts being adapted to engage and hold a sheet between their contacting surfaces in said U-shaped path of travel, and a plurality of pressure rollers supported along said U-shaped path and in rolling contact with said belts on the interior side thereof to provide substantially uniform contact pressure between said belts along said U-shaped path, said V-belts having on their contacting backs stud-like projections for providing better contact between the liquid in said tank and the portion of the sheet held between said belts.

7. Apparatus for continuous fluid treatment of strips of sheetlike material under tension comprising a tank adapted to contain a treating liquid, a cylinder mounted for rotation in said tank about a horizontal axis, a second cylinder mounted for rotation about an axis parallel with said first-mentioned axis and mounted above said tank, pulleys on each end of said cylinders, a pair of V-belts mounted over and extending between respective pulleys on said cylinders, a second pair of V-belts mounted on pulleys with a portion of the travel thereof being through a U-shaped path with the V-belts in back-to-back contacting relationship, said V-belts being adapted to engage and hold a sheet between their contacting surfaces in said U-shaped path of travel, and a plurality of pressure rollers supported along said U-shaped path and in rolling contact with said belts on the interior side thereof to provide substantially uniform contact pressure between said belts along said U-shaped path, said V-belts having holes in the contacting backs thereof for providing better contact between the liquid in said tank and the portion of the sheet held between said belts.

8. Apparatus for continuous fluid treatment of strips of sheetlike material under tension comprising a tank adapted to contain a treating liquid, a cylinder mounted for rotation in said tank about a horizontal axis, a second cylinder mounted for rotation about an axis parallel with said first-mentoined axis and mounted above said tank, pulleys on each end of said cylinders, a pair of V-belts mounted over and extending between respective pulleys on said first-mentioned axis and mounted above said tank, pulleys with a portion of the travel thereof being through a U-shaped path with the V-belts in back-to-back contacting relationship, said V-belts being adapted to engage and hold a sheet between their contacting surfaces in said U-shaped path of travel, and a plurality of pressure rollers supported along said U-shaped path and in rolling contact with said belts on the interior side thereof to provide substantially uniform contact pressure between said belts along said U-shaped path, said V-belts having affixed to the contacting backs thereof a layer of absorbent material for absorbing the liquid in said tank and thereby providing better contact between the liquid in said tank and the portion of the sheet held between said belts.

References Cited in the file of this patent

UNITED STATES PATENTS

| | | |
|---|---|---|
| 2,325,200 | Young | July 27, 1943 |
| 2,381,713 | Babicz | Aug. 7, 1945 |
| 2,558,066 | Wedler | June 26, 1951 |
| 2,719,714 | Pratt et al. | Oct. 4, 1955 |
| 2,724,254 | Zanger | Nov. 22, 1955 |

UNITED STATES PATENT OFFICE

CERTIFICATE OF CORRECTION

Patent No. 2,899,201                                         August 11, 1959

Ernst Pirot

It is hereby certified that error appears in the prited specification of the above numbered patent requiring correction and the the said Letters Patent should read as corrected below.

Column 2, line 48, for "oppositedly" read -- opposisly --; column 6, lines 12 and 13, for "embodimens" read -- embodiments -- column 8, line 34, for "first-mentoined" read -- first-mentioned --; lie 37, for "first-mentioned axis and mounted above said tank," read -- cylnders, a second pair of V-belts mounted on --.

Signed and sealed this 16th day of February 1960.

(SEAL)
Attest:

KARL H. AXLINE                                                ROBERT C. WATSON
Attesting Officer                                            Commissioner of Patents